United States Patent
Vitiello et al.

(10) Patent No.: US 11,433,552 B2
(45) Date of Patent: Sep. 6, 2022

(54) METHOD FOR THE ADAPTIVE CONTROL OF A WEARABLE ROBOT, SUCH AS AN ORTHESIS OR A PROSTHESIS, AND WEARABLE ROBOT OPERATING ACCORDING SUCH METHOD

(71) Applicant: SCUOLA SUPERIORE DI STUDI UNIVERSITARI E DI PERFEZIONAMENTO SANT'ANNA, Pisa (IT)

(72) Inventors: Nicola Vitiello, Pontedera (IT); Francesco Lanotte, Barletta (IT); Simona Crea, Lucca (IT)

(73) Assignee: SCUOLA SUPERIORE DI STUDI UNIVERSITARI E DI PERFEZIONAMENTO SANT'ANNA, Pisa (IT)

( * ) Notice: Subject to any disclaimer, the term of this patent is extended or adjusted under 35 U.S.C. 154(b) by 213 days.

(21) Appl. No.: 16/754,342

(22) PCT Filed: Oct. 10, 2018

(86) PCT No.: PCT/IB2018/057850
§ 371 (c)(1),
(2) Date: Apr. 7, 2020

(87) PCT Pub. No.: WO2019/073407
PCT Pub. Date: Apr. 18, 2019

(65) Prior Publication Data
US 2020/0331150 A1    Oct. 22, 2020

(30) Foreign Application Priority Data
Oct. 12, 2017 (IT) .................. 102017000114973

(51) Int. Cl.
*G06F 3/01*  (2006.01)
*B25J 13/08*  (2006.01)
*B25J 13/02*  (2006.01)

(52) U.S. Cl.
CPC ............ *B25J 13/088* (2013.01); *B25J 13/02* (2013.01); *G06F 3/011* (2013.01); *G06F 3/017* (2013.01)

(58) Field of Classification Search
CPC ........ B25J 13/088; B25J 13/02; B25J 9/0006; B25J 9/163; G06F 3/011; G06F 3/017; G05B 2219/40305
See application file for complete search history.

(56) References Cited

U.S. PATENT DOCUMENTS

2012/0283844 A1* 11/2012 Langlois ............... G05B 15/02
                                                     623/24
2015/0190248 A1    7/2015 Vitiello et al.

OTHER PUBLICATIONS

International Search Report and Written Opinion for Corresponding International Application No. PCT/IB2018/057850 (10 Pages) (dated Feb. 13, 2019).

* cited by examiner

*Primary Examiner* — Andrey Belousov
(74) *Attorney, Agent, or Firm* — Workman Nydegger

(57) ABSTRACT

The present invention is in the sector of wearable robotic devices, and in particular it concerns a method for the adaptive control of a wearable robot. In particular, the invention discloses a method for the adaptive control of the discrete or open-ended movements of a wearable robot such as a prosthesis or an orthesis.

19 Claims, 5 Drawing Sheets

METHOD FOR THE ADAPTIVE CONTROL OF A WEARABLE ROBOT, SUCH AS AN ORTHESIS OR A PROSTHESIS, AND WEARABLE ROBOT OPERATING ACCORDING SUCH METHOD

CROSS-REFERENCE TO RELATED APPLICATIONS

This application is a 371 of PCT/IB2018/057850, filed Oct. 10, 2018, which claims the benefit of Italian Patent Application No. 102017000114973 filed Oct. 12, 2017, the contents of each of which are incorporated herein by reference.

FIELD OF THE INVENTION

The present invention is in the field of wearable robotic devices, and in particular it concerns a method for the adaptive control of a wearable robot. In particular, the invention concerns a method for the adaptive control of a wearable robot such as a prosthesis or an orthesis and exoskeleton devices in general, in the execution of discrete or open-ended gestures. The invention also relates to a wearable robot operating according to said method.

BACKGROUND ART

As is well known, a wearable robot is a mechatronic device that extends, supplements, replaces or improves the function of the limb with which it interfaces.

Wearable robots can operate in synergy with human limbs, as in the case of robotic orthoses or exoskeletons, or they can replace as prostheses the missing limbs, for example as a result of an amputation. In detail, an orthesis is a mechanical structure, designed on the anatomy of the human limb, which supplements its missing or weakened capabilities resulting, for example, from an illness or a neurological disease, and restores the motor function to physiological levels. Robotic ortheses, or exoskeletons, enhance and/or restore the motor capabilities of the user, assisting or rehabilitating his/her movement. The prosthesis instead is an electromechanical device that replaces a limb lost as a result of an amputation. In robotics, prostheses become mechatronic limbs and allow to replace the function of the missing limb in a similar manner to its natural function.

In general, wearable robots comprise sensors that detect the movement of the limb to which they are associated, actuators and control strategies that allow to intelligently recognize the person's motor intentions and encode it into commands for the robot.

Wearable robots can be further classified on the basis of the joint they assist (e.g. for the upper or lower limb), whether they have a single joint or multi-joint structure, or whether they are active or passive (i.e. whether or not they have actuation sets that provide mechanical power to the user, for example by means of electric, hydraulic, pneumatic motors).

Typically, active robots for motion assistance and/or enhancement are required to implement a control system that:
(i) enables the robot to follow the person's movement (i.e. is transparent to the person's spontaneous movement, providing low output impedance);
(ii) understands the motor intention of the person, and
(iii) provides an assisting action (e.g. a torque or force) in the "critical" phases of the movement, i.e., for example, when the assisted human joint executes greater torque or expresses the maximum mechanical power.

To do this, typically the control system must classify the motor activity the person is carrying out, recognize the different phases of the motion gesture and provide adequate assistance.

Motion gestures are usually classified in two main categories, periodic gestures (e.g. walking, running) and discrete gestures (i.e., standing up/sitting down, gripping/handling an object).

In both cases, the requirements of an adaptive dynamic model (i.e. of a model consisting of a set of equations that describe the movement on the basis of inputs commonly represented by values of predefined motion variables measured by sensor means) that allows to observe, estimate and predict the person's residual movement are the following:

extracting the movement parameters: the model, which receives as inputs the movement sensor signals (for example angles, angular velocities, accelerations, pressures), must be able to extract in real time the characteristic parameters of the motion gesture measured from the acquired signals, for example the frequency, the phase and the amplitude of the movement in the case of a rhythmic movement (in the case of walking, for example, one can think of a dynamic model that in real time acquires the mobile joint angles of an ankle exoskeleton and processes them to estimate the cadence of the step and phase of the step cycle);

classifying the motion gesture: the parameters extracted by the model can be used to classify, and hence recognize, different activities (e.g. walking, running); one can think for example of a dynamic model used to walk where the phase and step frequency parameters can give indications on the type of locomotory activity carried out;

estimating the evolution of the system: the model must be able to estimate the evolution of the system, for example, the value of the mobile joint angle in real time or after a certain time or phase interval;

verifying the model: comparison of the estimate of the model at the current instant with the measurements of the movement sensors, it may be used to assess the validity of the model;

adaptability: the error between the estimate of the model and the measurements carried out may be used to modify the model itself in real time.

Recently, research is trying to apply also to the field of robotics the concept of "motor primitive", originally developed to described movement in the zoological field. According to the definition by Bizzi and Mussa-Ivaldi "the internal representations of the movement of the limbs are constructed by a group of motor primitives, which are organized as discrete modules at the level of the spinal cord, and by other construction blocks situated in superior cerebellar structures". Experimental studies show that the motor circuits of the spinal cord are organized in a set of discrete modules, each of which, when activated, produces a particular force field. The simultaneous activation of multiple modules leads to the vector combination of the corresponding fields. Force fields are interpreted as primitives which the central nervous system uses to generate a rich grammar of motor behaviors. The motor system would then be based on a collection of motor primitives that can be combined to give rise to complex movement repertoires: in other words, and trying to simplify, instead of calculating a trajectory every time it is necessary, some stereotyped trajectories are recalled and re-adapted to the parameters of the specific task.

This concept of motor primitive was applied to robotics; consider for example the Dynamic Movement Primitives (DMP) model introduced by Schaal and others [1] to generate trajectories of discrete or periodic movements to be applied to the control of robotic joints. The mathematical formulation of this "DMP" model comprises two sets of dynamic systems.

The first set is called output system and it represents the kinematic state of a joint. The number of output systems is equal to the number of degrees of freedoms (GDL) involved in the movement. The formulation of the output system is provided in equation 1.

$$\tau \cdot \dot{z} = \alpha_z \cdot (\beta_z \cdot (g-y) - z) + f, \quad \tau \dot{y} = z \tag{1}$$

where y is the position of the joint (i.e. the output of the model), z is the velocity of the joint, g is the final position of the movement, f is a forcing factor (i.e. an operator that attracts the evolution of the system towards a state of equilibrium in the space of the phases) and $\tau$, $\alpha_z$, $\beta_z$ are time constants. The formulation presented in equation (1) is that of a non-linear spring-damper system with external forcing. The peculiarity of the DMP model is in the forcing factor f that is designed to drive the convergence of the position of the joint towards the final position with different trajectories according to the gesture executed.

The second dynamic system is called canonic system and defines the dynamics of a variable phase that determines the time evolution of the system. This variable is common to all output systems (i.e. all degrees of freedom involved in the movement) and it coordinates the time evolution of the aforesaid systems. From the formulation of the canonic system, the modelled movement can assume rhythmic or discrete behavior.

In case of discrete movement, the canonic system describes an attractor in the space of the phases, a possible formulation whereof, highly used in the literature, is that of an integrator (equation (2)). In this case, the variable g in equation (1) represents the position at which the gesture is considered completed.

$$\tau \cdot \dot{x} = -\alpha_x \cdot x \tag{2}$$

where $\tau$, $\alpha_x$ are time constants and x is the phase.

In case of periodic movement, the canonic system describes a limit circle and the variable g in equation (1) represents the radius of the circle around which the movement will stabilize. A formulation of the limit circle is shown in equation (3).

$$\tau \cdot \dot{\varphi} = 1 \tag{3}$$

Where $\tau$ is a time constant and $\varphi$ is the phase.

The phase variable allows to uncouple the generated trajectory from time; therefore, the forcing factor is generally expressed as a function of the phase. The formulation of f proposed in the paper by Schaal is provided in equation (4) for discrete movements $$f(x, g, y_0) = \frac{\sum_{i=1}^{N} \psi_i \cdot w_i \cdot x}{\sum_{i=1}^{N} \psi_i} \cdot (g - y_0) \tag{4}$$

and in equation (5) for periodic movements:

$$f(\phi, A) = \frac{\sum_{i=1}^{N} \psi_i \cdot w_i}{\sum_{i=1}^{N} \psi_i} \cdot A \tag{5}$$

In both cases f is a sum of Gaussian bases, where $\psi_j$ is the $i_{th}$ Gaussian base with center $c_i$ and variance $h_i$, $y_0$ is the starting position, $w_i$ are the regression coefficients, A is the desired oscillation, in case of periodic movements.

To design the forcing factor in such a way as to assure the evolution of the trajectory of the DMP model along a desired generalized trajectory, a supervised approach can be followed. Assuming that a reference trajectory $y_{demo}(t)$ and its derivatives are available, an estimate of the forcing factor $f_{target}$ according to equation (6) can be obtained.

$$f_{target} = \tau^2 \cdot \ddot{y}_{demo} - \alpha_z \cdot (\beta_z (g - y_{demo}) - \tau \cdot \dot{y}_{demo}) \tag{6}$$

To express the term obtained in equation (6) as a weighted average of radial base functions (i.e. Gaussian kernels), different regression techniques can be used, i.e. iterative algorithms that, optimizing a cost function or the regression error, yield the optimal set of values to be assigned to the coefficients. Examples of regression techniques include Locally Weight Regression (LWR), Gaussian Process Regression (GPR), Reinforcement Learning (RL), Radial Basis Function Approximation (RBF), Linear Mean Squared Error (LMSE).

Once an optimal expression of the forcing factor f is obtained, the DMP model evolves over time according to the dynamics of the canonic system and in space according to the trajectory called primitive.

In humanoid robot control applications, this trajectory, expressed in the space of the joints, is provided as a desired trajectory for the low-level controller of the joint considered (for example that can implement a position, force, impedance controller).

With regard to discrete or open-ended gestures, it should also be considered that every joint involved in the execution of a discrete movement can be described by a motor primitive, that is, a trajectory that describes the kinematic evolution of the joint for the movement in question. The motor primitive is non-dimensional: it does not depend on kinematic parameters (such as the initial and final value, the amplitude of the variable, the speed of execution) or time parameters (the duration of the movement). In other words:
- the motor primitive describes the movement not with absolute values but with relative values;
- the motor primitive is not expressed as a function of time but as a function of an independent variable, often called phase, which goes from the start of the gesture to the completed gesture.

While there are several examples of dynamic models developed on the basis of the concept of motor primitive for applications tied to the control of wearable robots in periodic gestures (for example in walking assistance applications, see [4], [5], [6]), at present there are no known satisfactory models for the management of the discrete, or open-ended gestures. Most of the known dynamic model for the execution of discrete movements ([2], [3] [7]) were proposed for applications in humanoid robotics or for interaction control in end-effector robots: in these applications, some of which use pre-recorded libraries as a result of reference movements previously executed by the specific user, typically the model describes the motion gesture which the robot has to execute (for example a reaching movement of the arm or the trajectory which the user must execute when it interacts with the robot) but does not have an adaptive character: the gesture is predefined, i.e. its duration in time and kinematics (e.g. initial and ending position of the individual joints) are calculated and set before the start of the movement.

The lack of adaptability in terms of time and kinematics makes this type of models not applicable for the control of wearable robots like the ones described above. In the case of these applications, the parameters of the open-ended gestures are not known a priori but must be calculated in real time to make the algorithm able to observe, estimate and predict the human movement and hence to generate an adequate assistive control strategy.

If e.g. the lifting of a load is considered, executed by a user wearing an exoskeleton for assistance to the flexoextension of the hip and of the torso, the kinematics of the joints involved in the movement and measured by the robot is not known a priori but depends for example on the position of the load with respect to the person, on the weight of the load itself and on the point of arrival of the gesture, i.e. on the point where the load is to be positioned.

Ultimately, models like the aforementioned ones are not suitable for applications in wearable robotics in which one desires to implement a control strategy that is adaptive and hence cooperative with the user (i.e. one that adapts to the user's residual movement) for discrete movements. In particular, referring to the known mathematical model illustrated above and described in detail by equations (1)-(6), the trajectory generated by the model has a fixed time evolution, dictated by the formulation of the canonic system and by the choice of the time constant, and converges to the final position g that is determined a priori (before the movement starts). These characteristics do not assure a true cooperative interaction between human and robot: the robot would impose the movement to the user without adapting to his/her movement.

SUMMARY OF THE INVENTION

An object of the present invention is therefore to provide a method for estimating a motion variable in a discrete gesture performed by a user wearing a wearable robot.

In particular, an object of the invention is to achieve an adaptive control of a wearable robot in the act of performing discrete or open-ended gestures, whose duration and kinematics are not predefined, i.e. that adapts to the natural movement of an external agent that determines its dynamic evolution (i.e. the user who wears the wearable robot and carries out the movement).

A particular object of the invention is to provide a method and related wearable robot according to which there is a predictive observation of the evolution of the system for the discrete gesture under execution.

These objects are achieved according to the invention, according to claim 1, by a method for estimating in real time the evolution of at least one motion variable in a discrete gesture performed by a user wearing a wearable robot comprising control means and sensor means adapted to measure said at least one variable, wherein:

a motor primitive library is recorded in said control means for a corresponding plurality of possible discrete gestures, each motor primitive comprising an array of predetermined values for the at least one motion variable in the performance of the relative gesture, sampled as a function of a non-dimensional phase of said gesture;

and wherein, as one of said discrete gesture is performed by the user, said control means iteratively execute sequences of control steps, each comprising the steps of:

receiving by said sensor means a measured current value of said at least one variable;

retrieving an error by comparison of said current value and an estimated value of the variable obtained at the previous sequence;

on the basis of said error and of a normalization of the current value of the motion variable, updating the motor primitive of the gesture being performed, and retrieving from said normalization and from said updated motor primitive a current phase of the gesture being performed;

on the basis of said current phase, and of a predetermined dynamic model function of at least said phase, obtaining said estimated value of the motion variable to be used at the subsequent sequence to retrieve said error;

on the basis of said current phase, making use of said primitive or of said predetermined dynamic model, retrieving a predictive value of said motion variable in a determined subsequent time or phase period.

Preferred embodiments of the method are set forth in the secondary claims from 2 to 11.

In addition to the method, clearly an object of the invention is also a wearable robot to be worn by a user, implementing the method itself, i.e. comprising control means and sensor means adapted to measure at least one motion variable in a discrete gesture of said user, wherein:

a motor primitive library is recorded in the control means for a corresponding plurality of possible discrete gestures, each motor primitive comprising an array of predetermined values for the at least one motion variable in the performance of the related gesture, sampled as a function of a non-dimensional phase of said gesture;

and wherein said control means are configured to iteratively execute, as one of the discrete gestures is performed by the user, sequences of control steps, each comprising the steps of:

receiving by said sensor means a measured current value of the at least one variable;

retrieving an error by comparison of the current value and an estimated value of the variable obtained at the previous sequence;

on the basis of the error and of a normalization of the current value of the motion variable, updating the motor primitive of the gesture being performed, and retrieving from the normalization and from the updated motor primitive a current phase of the gesture being performed;

on the basis of the current phase, and of a predetermined dynamic model implemented on the control means, a function of at least said phase, obtaining said estimated value of the motion variable to be used at the subsequent sequence to retrieve the error;

on the basis of the current phase, making use of the primitive or of the predetermined dynamic model, retrieving a predictive value of said motion variable in a determined subsequent time or phase interval.

According to preferred embodiments of the wearable robot, on its control means instructions are implemented to carry out the sequences and the steps of the preferred embodiments for the method.

The present invention also covers a computer program that comprises instructions to make a wearable robot, such as the one just described, execute the method according to the invention, and an electronic support on which said computer program is stored.

BRIEF DESCRIPTION OF THE DRAWINGS

The characteristic and advantages of the control method for wearable robot and related wearable robot according to the present invention will be more readily apparent from the description that follows of an embodiment thereof, provided by way of non-limiting example, with reference to the accompanying drawings, in which.

DETAILED DESCRIPTION OF THE INVENTION

The method according to the invention allows to estimate the predictive value of at least one motion variable in a wearable robot, such as an orthesis or a prosthesis. In particular, the method allows to estimate the predictive value of at least one motion variable in a discrete or open-ended gesture.

The motion variable is often represented by the value of an angle of movement of a human joint and hence of a corresponding joint of the wearable robot; for example, in a hip orthesis with sensor on the joint, this variable will be the angle of flexoextension of the hip itself.

Nevertheless, the variable can also be represented by other values such as a position, a velocity, an acceleration, a force, a pressure, or any quantity, combination or vector of quantities useful to assess the movement of the user and/or that characterizes its evolution.

The wearable robot comprises sensor means and control means. The sensor means are represented by onboard sensors that allow to measure in real time the reference values for each joint or portion of the robot (such as those mentioned above, or commonly, angles, torque, velocity, pressure etc.). The control means are instead embodied by a memory and control board that processes in real time on the basis of the predictive value retrieved by the method according to the invention a strategy for controlling actuator means of the robot, assistive of the gesture to be carried out and coordinated therewith.

Figure 1:
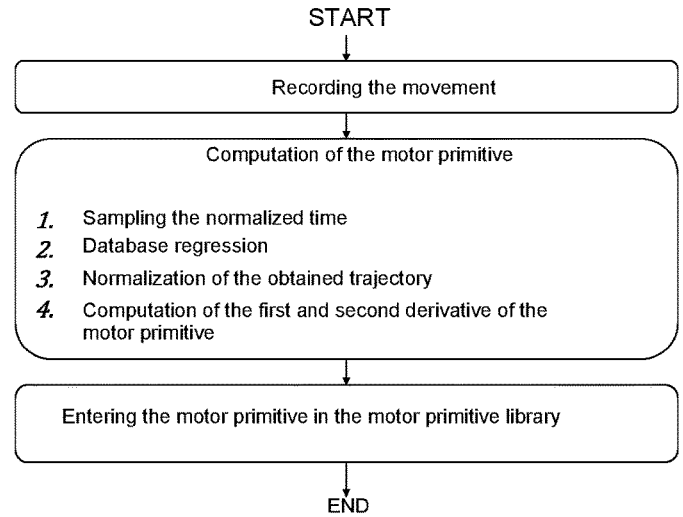
FIG. 1 represents by means of a block diagram the steps for implementing a library of arrays of values of motor primitives for each discrete gesture performed by the user of a wearable robot.

Preparatory to the implementation of the estimation method of the invention is the step of implementing a library of arrays of values of motor primitives for discrete gestures that are used as reference trajectories by the algorithms for estimating the phase and the evolution of the system, whose steps are shown in FIG. 1. More in detail, for a plurality of possible discrete gestures of the users a corresponding library of arrays is computed, each array comprising predefined values calculated on the basis of the value of the motor primitive at the determined instant of sampling for the at least one motion variable in the performance of the related gesture. Sampling is carried out on the basis of a non-dimensional phase of performance of the gesture, i.e. on the basis of its value of completeness. There is a univocal correspondence between the discrete gesture considered and the value of the motor primitive present in the library, i.e. no gesture is described by multiple primitives. Therefore, the library comprises matrices of values with a number of rows equal to the number of sensors provided for the related gesture and a number of columns equal to the number of samplings carried out for each sensor, or vice versa.

The motor primitive for a discrete gesture can thus be of two types, according to the number of sensors used by the wearable robot in the observation of the gesture performed by the user:

Scalar the motor primitive is one-dimensional, i.e. it expresses the evolution of the signal of a single sensor during the performance of the discrete gesture whereof the motor primitive is a reference. This can take place for those wearable robots that use a single sensor to observe the user's movement, be it simple (e.g. flexoextension, ab-adduction of a joint) or complex (e.g. gripping objects, bending).

Vectorial: the motor primitive is multi-dimensional, i.e. it expresses the evolution of the signal of multiple sensor during the performance of the discrete gesture for which the motor primitive is a reference. It thus consists of different components, each corresponding to the signal of a sensor. All components are synchronized inasmuch as they are referred to the same phase variable. It is applicable both for simple movements and for complex movements; in both cases, the various sensors collect the information deriving from different parts of the wearable robot during the user's movement.

The library contains different values corresponding to a finite number of motor primitives representing the different movements the user can perform with a wearable robot. For example, the library of a shoulder-elbow exoskeleton, with sensors positioned on the joints and/or on the segments of the limb, can contain vectorial primitives for the flexoextension of the elbow, flexoextension of the shoulder, ab-/adduction of the shoulder, gripping objects, throwing objects, pouring a liquid into a container, for a total of six motor primitives.

The library, created offline, is recorded in the memory board of the wearable robot, so that it is always operatively interfaced with the means of control of the robot and can be updated through learning strategies from the movement of the robot itself in real time, or from the exterior at any time.

The library of motor primitives can be created from acquisitions in different conditions (different starting values, arrival values, speed of execution, range of motion).

The gesture can be recorded by means of wearable sensors, motion tracking systems, sensors aboard the wearable robot.

The trajectories of the motion variable collected in the library are first expressed as a function of the normalized time of execution and subsequently sampled on a fixed number of samples that will express the phase variable. Linear and/or nonlinear regression techniques (RBF, LMSE, LWR, iLWR, GRP, RL, and the like) can be used to calculate the trajectory that best approximates the trajectories of the database. The trajectory obtained is then normalized in amplitude according to any normalization technique (for example Zeta-Score, Normalization between 0 and 1, Normalization between −1 and 1, Normalization with respect to a reference value).

The calculated trajectory (normalized in time and in amplitude) will then be the motor primitive of the discrete movement considered and it will be inserted in the library of motor primitives for discrete gestures. The two derivatives of the motor primitive, that will be used in the method described farther on, are also calculated.

Figure 2:
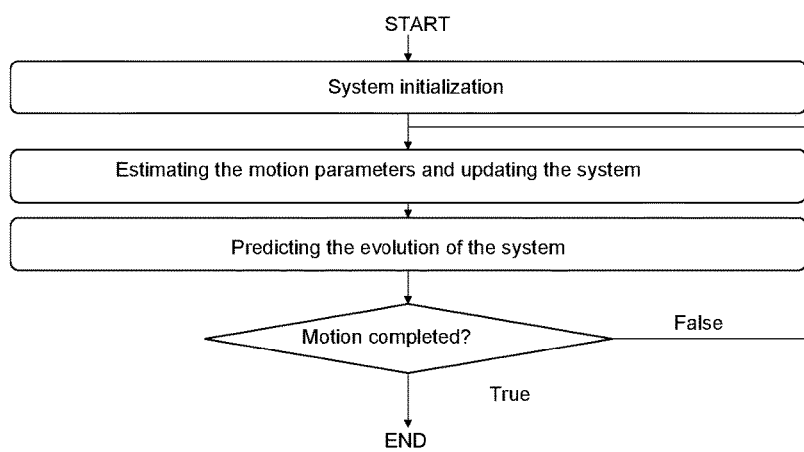
FIG. 2 is a block diagram representing the steps of the adaptive dynamic method according to the invention.
Figure 3:
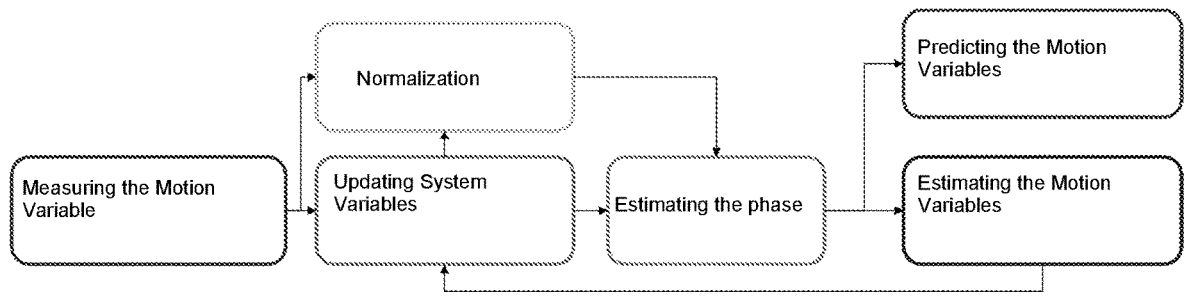
FIG. 3 is a graphic representation of the adaptive dynamic method according to the invention.

Following the implementation of the library the method comprises a series of sequences of steps that repeat iteratively. In particular, the method, with particular reference to FIGS. 2 and 3, comprises the fundamental steps of:
- receiving by said sensor means a measured current value of the at least one variable;
- retrieving an error by comparison of that current value and an estimated value of a variable obtained at the previous sequence of the iteration;
- on the basis of the value of error and of a normalization of the current value of the motion variable, updating the motor primitive of the gesture being performed, and retrieving from that normalization and from the updated motor primitive a current phase of the gesture being performed;
- on the basis of the current phase, and of a predetermined dynamic model, a function of at least one phase, obtaining an estimated value of the motion variable to be used at the subsequent sequence to retrieve the error;
- on the basis of the current phase, making use of the primitive or of the predetermined dynamic model, retrieving a predictive value of the motion variable in a determined subsequent time or phase interval.

In an embodiment, the method advantageously further comprises an initializing step in which the control means establish an initial value of the variable at an initial time of the gesture and a final estimated value of the at least one motion variable with the gesture completed and in each iterative sequence the estimated final value is updated as a function of the error. According to this solution, at least the current value, the initial value and the estimated updated final value are used in each sequence to retrieve the normalization of the current value, although the normalization may also employ other values, for example—in case of primitives that are not strictly monotonous schematized as sequences of monotonous branches—of local maximum and minimum values. The estimated value of the motion variable at the subsequent step is then obtained on the basis of the dynamic model also as a function of the estimated updated final value and of the current value of the variable.

This dynamic model is a mathematical model representative of the control system, which advantageously employs equations that correlate the current value, the value estimated at the subsequent step, the related derivatives and the estimated final value through a forcing factor that is a function of the phase (which is computed in the initialization step on the basis of the motor primitive relating to the gesture being performed).

In this case, the forcing factor computed initially is also updated on the basis of the error, the forcing factor corresponding to the current phase of the gesture being performed is obtained, and the estimated value of the motion variable at the subsequent step is estimated on the base of the dynamic model with the forcing factor corresponding to the current phase.

Updating in real time the motor primitive and, if applicable, the forcing factor, as a function of the error of the value of the controlled variable with respect to the estimate, allow to realize a constant adaptation to the current state of the movement, and thus to determine the current phase in the most accurate way possible.

Each sequence advantageously comprises a step of verifying the conclusion of the gesture being performed, as the assessment of unitary current phase or of presence of external disturbance.

A possible embodiment of the method according to the invention will now be described in further detail, for exemplifying purposes and without limitation, for each iteration $i_{th}$, the iteration frequence possibly being, for example (but without limitation), 100 Hz. For the sake of simplicity, the sole motion variable $\theta$ is considered, and the dynamic model is an output system like the one of the DMP model to which reference was made in the introductory part. In general, other analytical models may be used (such as, without limitation, the VITE model [8], Schoner model [9], or other dynamic models contained in [10]) that represent the controlled system according to a finite number of degree of freedom that evolve in time according to a deterministic law.

1) System Initialization

Figure 4:
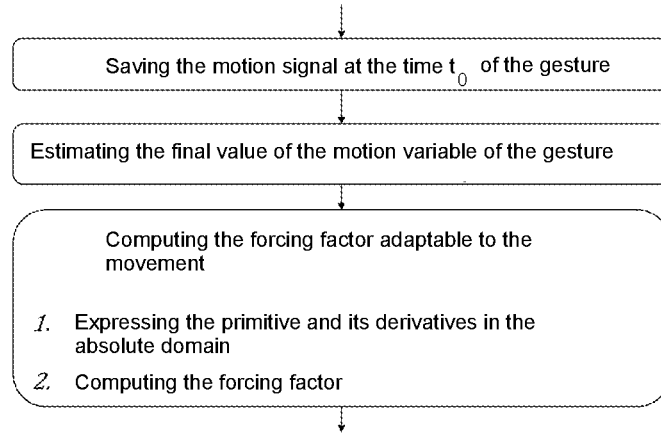
FIG. 4 represents, with a block diagram, the steps of an initialization phase.
Figure 5:
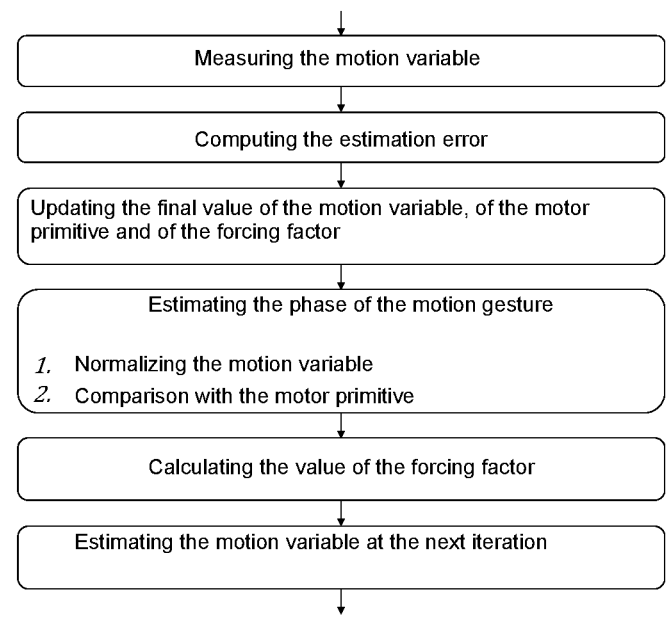
FIG. 5 is another block diagram of the steps of a phase of estimating the movement parameters and updating a predetermined model of the kinematic state of the joint.
Figure 6:
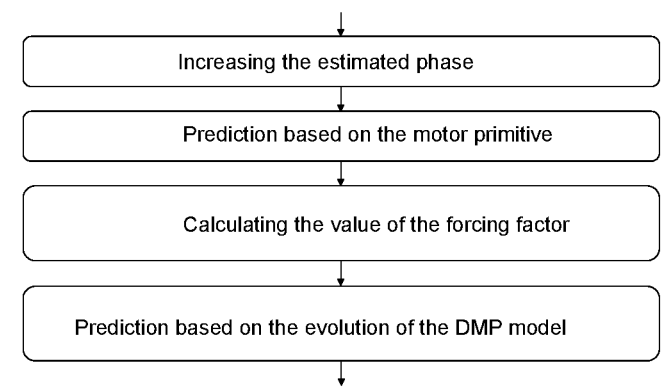
FIG. 6 shows the steps of a phase of predicting the evolution of a motion variable associated with the robot.

Clearly, this step takes place at the first sequence of the process, and its characteristics are shown extensively in the block diagram of FIG. 4. As mentioned above, the initialization of the system requires the control means to establish an initial value of the variable at an initial time of the gesture and an estimated final value at the completion of the movement. In particular, the following occurs:

i. Saving the motion signal at the time $t_0$ of the gesture. The value of the motion variable at which the discrete movement started $\theta_0 = \theta(i=1)$ or current time at iteration 0 is recorded.

ii. Estimating the final value of the motion variable of the gesture. The value of the motion variable in which the gesture will be concluded is estimated $\theta_T(i)$. It can be calculated choosing a plausible value, or proportionately to the absolute values of the primitive. The exact initialization value is not crucial since the final value of the motion variable of the gesture is an adaptive variable of the system. The initial value and the estimated final value are used in each sequence of the method to retrieve a normalization of the current value.

iii. Computing the forcing factor. the forcing factor is calculated following the approach of the equation (6), starting from a reference trajectory (primitive) and from its first two derivatives expressed in the absolute domain (i.e. expressing the trajectory in degrees, radiants, meters or the like). The primitive and its first two derivatives are then brought to the absolute domain according to the values of the motion variable calculated in the preceding steps i and ii. equation (6) is reformulated to calculate the forcing factor using the primitive as a reference trajectory (equation (7) below):

$$f(\varphi) = \tau^2 \cdot \ddot{p}_a(\varphi) - \alpha_{Z'}(\beta_{Z'}(\theta_T(i) - p_a(\varphi)) - \tau \cdot \dot{p}_a(\varphi)) \qquad (7)$$

where $p_a(\varphi)$, $\dot{p}_a(\varphi)$, $\ddot{p}_a(\varphi)$ is the primitive and its derivatives expressed as a function of the phase and brought to the absolute domain, $\theta_T(i)$ is the estimate of the final value of the motion variable of the gesture, $f(\varphi)$ the forcing factor calculated as a function of the phase cp.

2) Estimating the Movement Parameters and Updating the System

In this step, the phase of the movement performed by the user is estimated using the motor primitive of the discrete movement being performed. Thanks to the estimated phase, the system can estimate the evolution of the system at the subsequent iteration (i.e. the value of the measured motion variable) and, calculating the estimation error, update the variables of the system adapting them to the current state of the user's movement. In the example solution proposed herein, in particular, one has:

i. Measuring the motion variable: The motion sensors in use provide the value of the variable observed at the current instant $\theta(i)$ and, if necessary, its first and second derivatives;

ii. Computing the estimation error: The measured motion variable is compared with the value estimated by the model at the previous iteration $\hat{\theta}(i-1)$, providing a measure of the validity of the system.

$$\epsilon(i) = \theta(i) - \hat{\theta}(i-1) \qquad (8)$$

iii. Updating the final value of the motion variable, of the motor primitive and of the forcing factor: The estimation error is used to update the estimate of the final value of the motion variable, the motor primitive and the forcing factor, in order for these variables to become adaptable to the user's movement. The update occurs according to any control formulation (e.g. proportional, proportional-integral, proportional-derivative, proportional-integral-derivative, or a learning coefficient depending on the estimation error that multiplies the variable to be updated). Given that y(i) is the variable to be updated and $K_p$, $K_i$, $K_d$ and $K_l$ of the gain coefficients, two possible formulations are expressed in equation (9) and (10).

$$y(i) = y(i-1) + K_p \cdot \epsilon(i) + K_i \cdot \int_{j=1}^{i} \epsilon(j) \cdot dj + K_d \cdot \frac{d\epsilon(i)}{di} \qquad (9)$$

$$y(i) = y(i-1) \cdot K_l(\epsilon(i)) \qquad (10)$$

iv. Estimating the phase of the motion gesture: The comparison between the measured variable (expressed consistently with the motor primitive, i.e., normalized in amplitude for the difference between the initial value $\theta_0$ retrieved in the initialization steps and for the updated estimated of the final value of the motion variable of the gesture $\theta_T(i)$) and the primitive itself allows to estimate the current phase of the discrete movement being performed $\varphi(i)$. This comparison takes place thanks to a function that puts in relation the motion variable with the phase of the discrete gesture being performed. Practically, this means that the phase corresponding to the value of the primitive most similar to the normalized measured variable is the current phase of the motion gesture. By calculating for example the inverse function of the primitive, if invertible, with respect to the phase it is possible to calculate the phase for a given measure of the motion variable. An additional comparison method involves the use of the motor primitive as look-up table to calculate the phase, for a given measure of the motion variable.

v. Calculating the value of the forcing factor: The estimate of the phase of the motion gesture is used to calculate the corresponding value of the forcing factor, which will be an input variable to the dynamic model.

vi. Estimating the motion variable at the next iteration: the equations established by the dynamic model are executed, such as in particular those suggested by the DMP model, giving as inputs to the equations: the current value and its first derivative of the measured motion variable, the estimate of the final value of the variable, the value of the forcing factor corresponding to the estimated phase of the system. An estimate of the variable at the subsequent iteration $\hat{\theta}(\varphi(i))$ is retrieved as from the following system (11):

$$\begin{cases} \dot{\hat{\theta}}(i+1) = \dot{\hat{\theta}}(i) + dt \cdot \dfrac{\alpha_Z \cdot \left(\beta_Z \cdot (\theta_T(i) - \theta(i)) - \dot{\theta}(i)\right) + f(\varphi(i))}{\tau} \\[6pt] \hat{\theta}(i+1) = \theta(i) + dt \cdot \dfrac{\alpha_Y \cdot \dot{\hat{\theta}}(i+1)}{\tau} \end{cases} \qquad (11)$$

3) Predicting the Evolution of the System

This process provides an estimate of the evolution of the variable measured in a certain time or phase interval. Two possible modes are:

i. Prediction based on the motor primitive. The motor primitive is used as a look-up table. Knowing the phase of the movement at the instant i $\varphi(i)$, the value of the variable measured at the phase $\varphi(i)+\Delta\varphi$ or at the instant $i+\Delta T$ corresponding to a phase $\varphi(i+\Delta T)$ is estimated. A prediction of the variable at the increased phase value $\hat{\theta}_p^*(\varphi(i)+\Delta\varphi)$ is retrieved.

ii. Prediction based on the evolution of the dynamic model a. Calculating the value of the forcing factor. The value of the forcing factor is calculated, corresponding to the phase $\varphi(i)+\Delta\varphi$ at which the prediction of the motion variable is to be estimated.

b. Prediction based on the evolution of the DMP model. The DMP model is executed giving as inputs to the equation the estimate of the final value of the motion variable and the value of the forcing factor corresponding to the phase $\varphi(i)+\Delta\varphi$ at which the prediction is to be obtained. A prediction of the motion variable at the increased phase value $\hat{\theta}_{DMP}^*(\varphi(i)+\Delta\varphi)$ according to equation (12) below is retrieved.

$$\begin{cases} \dot{\hat{\theta}}_{DMP}^*(\varphi(i)+\Delta\varphi) = \dot{\hat{\theta}}_{DMP}^*(\varphi(i-1)+\Delta\varphi) + dt \cdot \dfrac{\alpha_Z \cdot \left(\beta_Z \cdot (\theta_T(i) - \hat{\theta}_{DMP}^*(\varphi(i-1)+\Delta\varphi)) - \dot{\theta}(\varphi(i-1)+\Delta\varphi)\right) + f(\varphi(i)+\Delta\varphi)}{\tau} \\[6pt] \hat{\theta}_{DMP}^*(\varphi(i)+\Delta\varphi) = \hat{\theta}_{DMP}^*(\varphi(i-1)+\Delta\varphi) + dt \cdot \dfrac{\alpha_Y \cdot \dot{\hat{\theta}}_{DMP}^*(\varphi(i)+\Delta\varphi)}{\tau} \end{cases} \qquad (12)$$

4) Conclusion of the Movement.

At each iteration, for each sequence, an assessment is made as to whether the discrete movement has ended. The movement is considered ended in the presence of external disturbances, if the current phase reaches the unitary value or $\varphi(i)=100\%$, or others able to provide the same result. If "False", then the processes 2-3 are repeated at the subsequent iteration. If "True", then the system considers the discrete movement to be concluded.

Figure 8A:
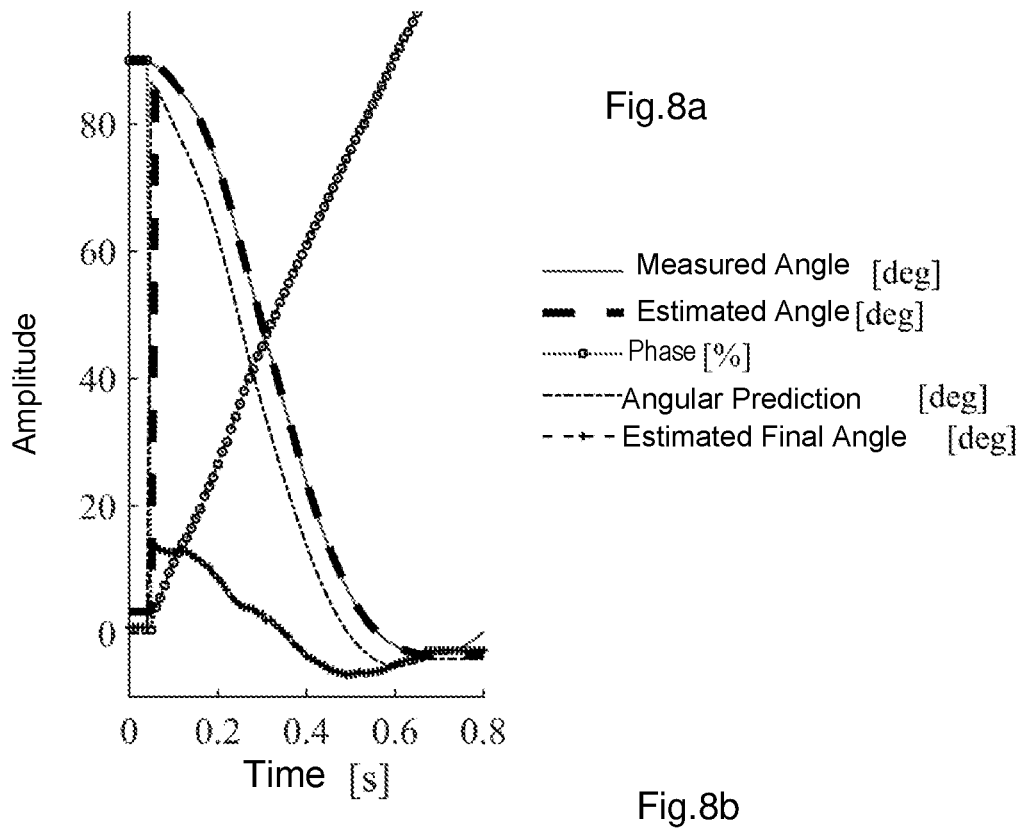
FIGS. 8a and 8b show in chart form respectively the evolution in amplitude and time of the kinematic model and in torque and time of the control strategy.
Figure 8B:
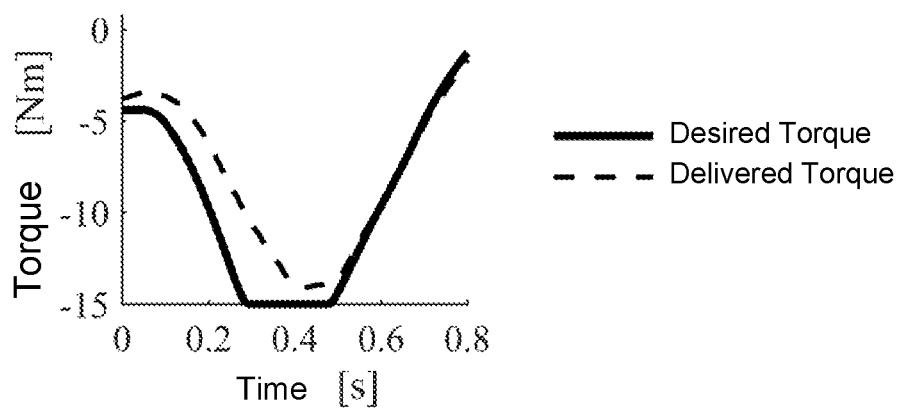

An example of possible application is discussed in FIG. 8, which represents the application of the method proposed in the control scheme of a wearable robot for assistance to the flexoextension of the hip in the gesture of lifting a weight.

In this case the measured motion variable is the joint angle, measured by means of encoders located on the mobile joint (i.e. provided with at least one degree of freedom) of flexoextension of the robot, corresponding to the human hip joint The control system controls the torque delivered on the joint (assistive action) and performs the following operations:

a. At the first iteration in which the motion gesture is recognized to be performed, the system initializes.
b. Subsequently, the estimation and prediction processes are performed. From the figure, it is possible to note the evolution of the instantaneous estimate of the angular position of the joint and the evolution of the predictions of the angular position.
c. Simultaneously the phase evolves from 0 to 100%
d. The estimate of the angle at which the motion gesture is constantly updated: when this angular position converges to the measured angular position, the phase reaches the maximum value of 100% considering the movement concluded.
e. Moreover, being based on the difference between the current position of the joint and its prediction, it is possible to calculate (see also what clarified hereafter) a desired value of assistive torque, to be delivered by means of any actuation means with which the wearable robot can be provided.

Figure 7:
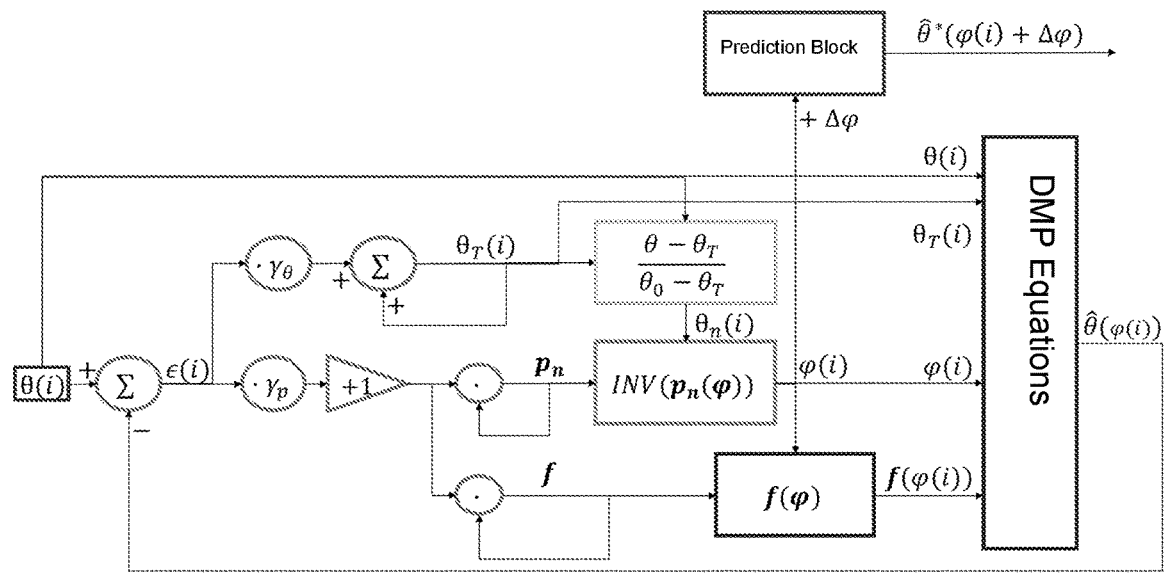
FIG. 7 shows the algorithm that materializes the method of the preceding figures (FIGS. 3, 5, 6)

By way of further example, let it be supposed that the robot has a single mobile joint and has an encoder that observes the angular position of said joint, which angular position therefore being the motion variable; FIG. 7 shows a possible implementation of the method for this single joint model. The angular position measured by the encoder $\theta(i)$ constitutes the input, together with the variables initialised at the first iteration according to the system initialization process. The estimate error is calculated as the difference between the measured position and the estimated position at the previous iteration, i.e. $\epsilon(i)=\theta(i)-\hat{\theta}(\varphi(i-1))$. The estimate error is used in the subsequent blocks to update the estimate of the final angular position $\theta_T(i)$, the motor primitive $p_n(\varphi)$ and the forcing factor $f(\varphi)$, according to two gain coefficients $\gamma_0$ and $\gamma_p$. It can be observed that the update in the figure is of the proportional type, but the integral and derivative contributions can also be included, or a different updating method can be adopted. In this way, the dynamic model will adapt to the user's movement. The angular position is subsequently normalized, in this case between 0 and 1, utilizing the estimate of the final angular position $\theta_T(i)$ and the initial angular position $\theta_0$ stored at the first iteration. The normalized value obtained $\bar{\theta}(i)$ is used to estimate the phase of the discrete gesture inverting the updated discrete motor primitive, supposed in this example to be invertible, $\varphi(i)=p_n^{-1}(\bar{\theta}_n(i))$. The phase value obtained is used to select the right value of forcing factor to be used $f(i)=f(\varphi(i))$ which, with the variables $\theta(i)$ and $\theta_T(i)$, is used in the output system of the DMP model (equation (11)). The estimated position ($\varphi(i)$) is used to calculate the estimate error at the subsequent iteration. The estimated phase, increased by a predefined value $\Delta\varphi$, is subsequently used to predict the corresponding angular position $\hat{\theta}*(\varphi(i)+\Delta\varphi)$, according to the prediction process described at point 3).

Figure 9:
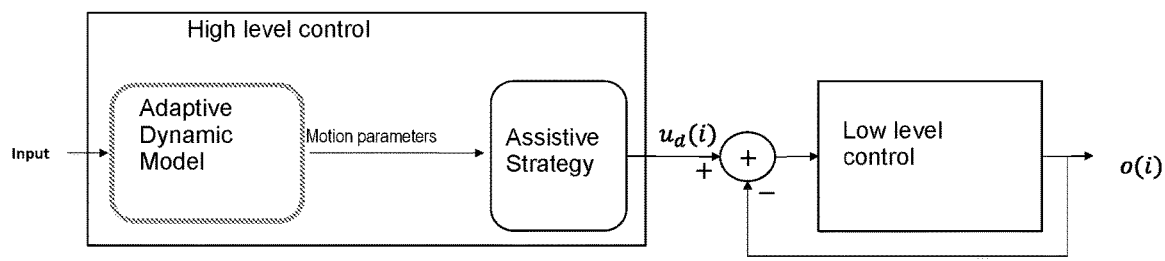
FIG. 9 represents with a block diagram a high- and low-level control of the wearable robot.

As stated above and as now made clearer from the preceding description, the predictive value obtained from the method according to the invention is used by the control means to compute an assistive control strategy of the robot. Said control strategy implements an output signal adapted for controlling at high-level said actuation means, said output signal being corrected through a low-level feedback correction by a measure signal of at least one control variable detected at an output of said actuation means. In particular, as shown in FIG. 9, $u_d(i)$ is the control variable while o(i) is the measurement of the control variable in output from the actuation means and used in closed loop for low-level control.

Figure 10:
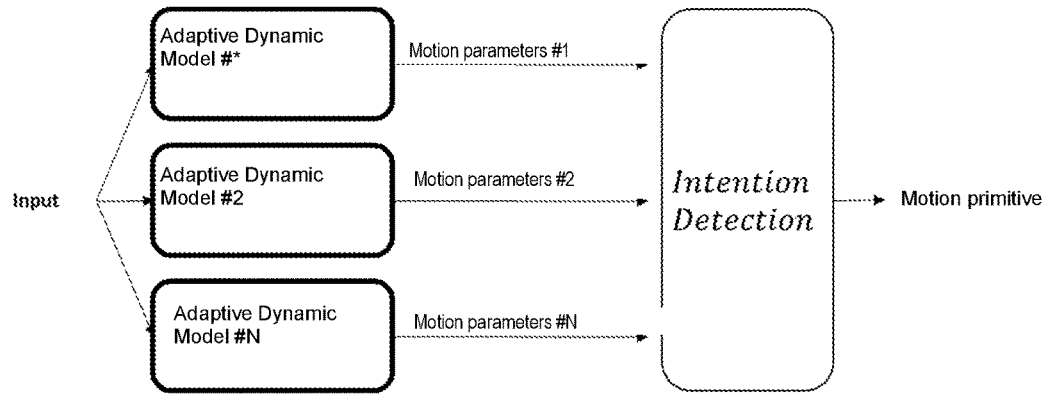
FIGS. 10 and 11 show graphic representations of the method according to the invention for the classification of the movement parameters of an adaptive robot.
Figure 11:
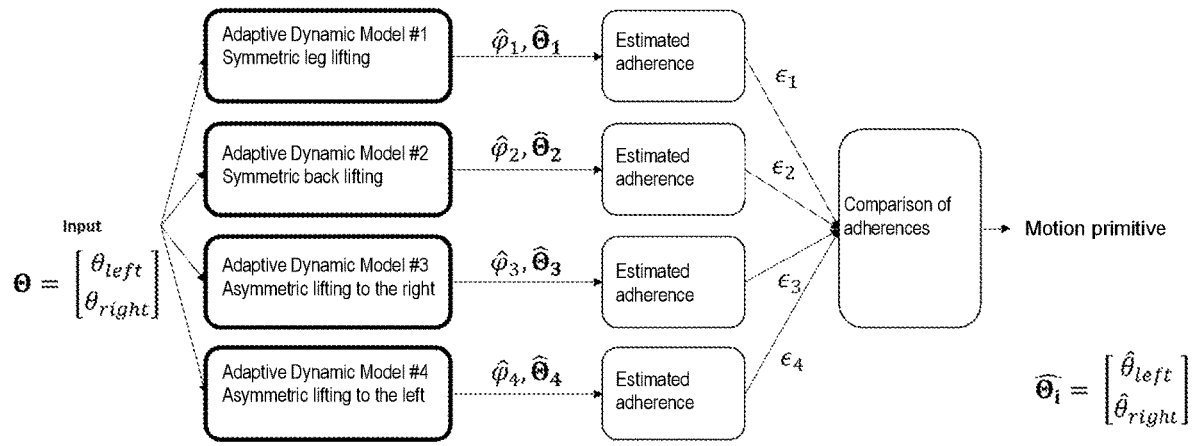

The method and the robot according to the invention can also be applied for recognizing the activity and hence decode the movement intention of a user (FIGS. 10 and 11). Using the adaptive dynamic models it is possible to "recognize" the ongoing motion activity, in particular extracting indexes of adherence of one or more controlled movement parameters with respect to the various adaptive dynamic models, and classifying the movement as similar to the primitive which is capable to describe the movement itself with the highest index of adherence. The parameters can include the predictive value of the motion variable, the estimated phase, the estimated final value, the updated primitives etc.

An example of this possible application of the invention pertains to the control of a wearable robot for assistance of the flexoextension of the hip; in particular, reference is made to the recognition (classification) in real time of the strategy with which the user is lifting a weight in order to adapt the assistance strategy (torque delivered by the robot) in a manner adequate to the movement.

In this case, the measured motion variables are the joint angles ($\theta_{right}$, $\theta_{left}$), measured by means of the encoders located on the flexoextension joints of the robot, in turn located coaxially to the user's hip joints.

With reference to FIG. 11, which represents in greater detail, with respect to the concept schematic of FIG. 10, an illustrative block diagram that exemplifies the functional logic of the method, let it be supposed that the library contains four vectorial primitives, with two components for the two encoders, to recognize the: (i) symmetric lifting bending the legs (i.e. squat), (ii) symmetric lifting bending the back (i.e. stoop), (iii) asymmetrical lifting to the right and (iv) asymmetrical lifting to the left. Hence, there are four different adaptive dynamic models operating according to the method of the invention. The motion variable $\Theta=(\theta_{right}, \theta_{left})$ constitutes the same input for all adaptive dynamic models. The movement parameters, such as, for example, the estimated phases and the estimates of the motion variables, are assessed by a block that assesses the adherence of the parameters to the primitive of the respective adaptive dynamic model (for example by means of the linearity of the estimated phase, or the correlation index between the estimated of the motion variable and the respective primitive). At the output from each block there is provided an index of adherence $\epsilon_i$ of the motion variable with the primitive. A subsequent block examines all adherence indexes and classifies the movement as similar to the primitive capable to describe the movement with a high index of adherence.

Alternatively, the movement parameters can constitute the input to machine learning algorithms known in the literature (for example but without limitation, neural networks, support vector machines, decision trees, rule-based algorithms, etc.). As a further example of this possible application of the invention, the control of a lower limb robotic prosthesis can be considered, in particular for recognition in real time of the user's motion intention, to be able to adapt the control of the prosthesis in an adequate manner. Let it be supposed that three possible locomotion modes starting from the erect position need to be recognized: (i) walking over flat terrain, (ii) climbing stairs and (iii) descending stairs. In this case, the motion variables can be the angular velocities, the linear accelerations and the orientation measured by an inertial sensor positioned on the socket of the prosthesis, or the Euler angles reconstructed starting from the information measured by the sensors. With reference again to the concept schematic of FIG. 10, a library that contains three primitives (scalar or vectorial according to the number of inputs one decides to use) is suitable to recognize respectively the transitions: (i) from erect position to walking over flat terrain, (ii) from erect position to climbing stairs, (iii) from erect position to descending stairs. The movement parameters are thus extracted and processed according to what has been described so far to be able to classify the observed movement.

The advantages of the method according to the invention are several. Among them:
- the described method can be applied to any signal or combination of signals that describes the movement;
- it does not require calibrations on the basis of the user, i.e. on the basis of the person who performs the movement;
- it is based on the use of an estimation model able to adapt to the observed discrete movement without knowing the parameters of the gesture a priori;
- it allows to "observe" the residual movement of the person and estimating its phase and amplitude adaptively, without imposing reference trajectories with time duration and amplitude defined a priori.

To summarize, the adaptive method according to the invention is able to observe, estimate and predict the evolution of discrete gestures on the basis of a library of motor primitives definable at will, without calibrations, with applicability to kinematic or dynamic variables, all relying on the estimate of the parameters that describe the current state of the performance of the gesture through the use of the adaptive motor primitive of the gesture. The movement is estimated by verifying in real time the validity of the adopted model, updating it (adaptability) so as to allow the estimate of the parameters of the movement (for example and in particular duration of the gesture, final value of the variables). All parameters and in particular the phase and the estimated final value of the variable do not have a value or an evolution defined a priori but are estimated in real time on the basis of the observation of the gesture performed by the user and are updated on the basis of the update. According to the invention, it is possible to implement additional algorithms when estimating and/or predicting a signal, or estimating the phase of a gesture, are required.

The architecture proposed herein finds vast application in the field of wearable robotics, allowing to assist/enhance the motor capabilities of an individual in each type of movement independently of the person who wears it and of the conditions of performance. Jointly with the control strategies for periodic gestures already present in the literature, the wearable robot will be more acceptable to the end user, who will be able to benefit from the action of the wearable robot in any motion gesture.

The areas of application of the method and related robot according to the proposed invention pertain to all the fields of use of a wearable robot: rehabilitation, movement assistance, industrial, military, personal use, sports.

The present invention has been described with reference to a preferred embodiment thereof. It should be understood that there may be other embodiments that pertain to the same inventive core, all within the scope of protection of the following claims.

BIBLIOGRAPHY

[1] S. Schaal, P. Mohajerian, and A. Ijspeert, "Dynamic systems vs. optimal control—a unifying view," Progress in Brain Research, pp. 425-445: Elsevier B.V., 2007.

[2] A. Ude, A. Gams, T. Asfour e J. Morimoto, "*Task-specific Generalization of Discrete and Periodic Dynamic Movement Primitives*" in Proc. IEEE Transaction on Robotics, Vol. 26, no 5, pp. 800-815, 2010;

[3] D. H. Park, H. Hoffmann, P. Pastor and S. Schaal "Movement Reproduction and Obstacle Avoidance with Dynamic Movement Primitives and Potential Fields" Humanoids 2008-8th IEEE-RAS International Conference on Humanoid Robots, Daejeon, 2008, pp. 91-98;

[4] J A. Gams and A. Ude. "*On-line Coaching of Robots Through Visual and Physical Interaction: Analysis of Effectiveness of Human-Robot Interaction Strategies*" 2016 IEEE International Conference on Robotics and Automation (ICRA), Stockholm, 2016, pp. 3028-3034;

[5] R. Huang, H. Cheng, Hongliang Guo, Q. Chen and X. Lin "*Hierarchical Interactive Learning for a HUman-Powered Augmentation Lower EXoskeleton*" 2016 IEEE International Conference on Robotics and Automation (ICRA), Stockholm, 2016, pp. 257-263;

[6] R. Huang, H. Cheng, H. Guo, X. Lin, Q. Chen and F. Sun "*Learning Cooperative Primitives with physical Human-Robot Interaction for a HUman-powered Lower EXoskeleton*" 2016 IEEE/RSJ International Conference on Intelligent Robots and Systems (IROS), Daejeon, 2016, pp. 5355-5360;

[7] K. Kamali, A. Akbar Akbari & A. Akbarzadeh "*Trajectory Generation and Control of a Knee Exoskeleton based on Dynamic Movement Primitives for Sit-to-stand Assistance*" Advanced Robotics, 30:13, pp. 846-860.

[8] S. Grossberg, D. Bullock, and S. Boston Univ Ma Center For Adaptive, The Vite Model: A Neural Command Circuit for Generating Arm and Articulator Trajectories: Defense Technical Information Center, 1988.

[9] G. Schoner, "A Dynamic Theory of Coordination of Discrete Movement," Biological Cybernetics, vol. 63, pp. 257-270, 1990.

[10] S. Degallier, and A. J. Ijspeert, "Modeling Discrete and Rhythmic Movements through Motor Primitives: a Review," Biological Cybernetics, vol. 103, no. 4, pp. 319-338, 2010.

The invention claimed is:

1. A method for estimating in real time the evolution of a motion variable in a discrete gesture performed by a user wearing a wearable robot, said robot comprising control means and sensor means adapted to measure a variable, wherein:
 a motor primitive library is recorded in said control means for a corresponding plurality of possible discrete gestures, each motor primitive comprising an array of predetermined values for the motion variable in the performance of the relative gesture, sampled as a function of a nondimensional phase of said gesture;

and wherein, as one of said discrete gesture is performed by the user, said control means iteratively execute sequences of control steps, each sequence comprising the steps of:

receiving by said sensor means a measured current value of said variable;

retrieving an error by comparison of said current value and an estimated value of the variable obtained at the previous sequence;

on the basis of said error and of a normalization of the current value of the motion variable, updating the motor primitive of the gesture being performed, and retrieving from said normalization and from said updated motor primitive a current phase of the gesture being performed;

on the basis of said current phase, and of a predetermined dynamic model function of said phase, obtaining said estimated value of the motion variable at the subsequent sequence, to be used to retrieve said error;

on the basis of said current phase, making use of said primitive or of said predetermined dynamic model, retrieving a predictive value of said motion variable in a determined subsequent time or phase period;

wherein said motion variable is a motion variable of a mobile joint of said wearable of robot, said dynamic model being a model of the dynamic behavior of said mobile joint.

2. The method according to claim 1, wherein a first of said sequences further comprises an initialization step in which said control means set an initial value of said motion variable at a zero time of the gesture and an estimated final value of the same variable at the end of the gesture;

wherein in each sequence: said estimated final value is updated as a function of said error; said current value, said initial value and said updated estimated final value are used to retrieve said normalization of the current value; and said estimated value of the motion variable at the subsequent sequence is obtained on the basis of said dynamic model also as a function of said updated estimated final value and said current value of the motion variable.

3. The method according to claim 2, wherein said dynamic model provides a correlation between said current value, said estimated value at the subsequent sequence, their derivatives, and said estimated final value, via a forcing factor function of said phase and initially computed in said initialization step on the basis of the motor primitive of the gesture being performed, each sequence further providing: updating said initially computed forcing factor function on the basis of said error; obtaining the forcing factor corresponding to the current phase of the gesture being performed; and estimating said estimated value of the motion variable at the subsequent phase on the basis of said dynamic model with said forcing factor corresponding to the current phase.

4. The method according to claim 1, wherein each of said sequences comprises a verification step that the gesture being performed has ended, said verification step comprising evaluation of a unitary current phase or detection of an external disturbance.

5. The method according to claim 1, each primitive in said motor primitive library comprises a matrix with a number of rows equal to a number of sensor of said sensor means provided for the relative gesture, and a number of columns equal to a number of samplings taken for each sensor, or vice versa.

6. The method according to claim 1, wherein said estimated value and/or said predictive value of said motion variable are used in real time by said control means to elaborate a control strategy of actuation means provided on said wearable robot, assistive of the gesture being performed and coordinated therewith.

7. The method according to claim 6, wherein said control strategy implements an output signal for a high-level control of said actuation means, said output signal being corrected through a low-level feedback correction by a measure signal of a control variable detected at an output of said actuation means.

8. The method according to claim 1, wherein the recorded libraries, corresponding dynamic models and one or more motion parameters including some of said values of said motion variable controlled by said control steps are made use of for carrying out an identification of the motor a activity and decoding a motor intention of said user.

9. The method according to claim 8, wherein said identification and decoding comprise the steps of extracting compliance indexes of said one or more motion variables with respect to said libraries and dynamic models, the comparison between said extracted compliance indexes, and the identification or decoding of the motion being performed as linked with the motor primitive that describes the same motion with highest compliance index.

10. The method according to claim 1, wherein said motion variable is the expression of one or more magnitudes, or combinations thereof, selected from the group consisting of: position, velocity, acceleration, force, pressure.

11. A wearable robot to be worn by a user, comprising control means and sensor means adapted to measure a motion variable in a discrete gesture of said user, wherein:

a motor primitive library is recorded in said control means for a corresponding plurality of possible discrete gestures, each motor primitive comprising an array of predetermined values for the motion variable in the performance of the relative gesture, sampled as a function of a non-dimensional phase of said gesture;

and wherein said control means are configured to iteratively execute, as one of said discrete gesture is performed by the user, sequences of control steps, each sequence comprising the steps of:

receiving by said sensor means a measured current value of said variable;

retrieving an error by comparison of said current value and an estimated value of the variable obtained at the previous sequence;

on the basis of said error and of a normalization of the current value of the motion variable, updating the motor primitive of the gesture being performed, and retrieving from said normalization and from said updated motor primitive a current phase of the gesture being performed;

on the basis of said current phase, and of a predetermined dynamic model function of said phase, obtaining said estimated value of the motion variable at the subsequent sequence, to be used to retrieve said error; and on the basis of said current phase, making use of said primitive or of said predetermined dynamic model, retrieving a predictive value of said motion variable in a determined subsequent time or phase period;

wherein the wearable robot further comprises a mobile joint, said motion variable being a motion variable of said joint.

12. The wearable robot according to claim 11, wherein a first of said sequences further comprises an initialization step in which said control means are configured to set an initial value of said motion variable at a zero time of the gesture and an estimated final value of the same variable at the end of the gesture; wherein in each sequence:

said estimated final value is updated as a function of said error; said current value, said initial value and said updated estimated final value are used to retrieve said normalization of the current value; and said estimated value of the motion variable at the subsequent sequence is obtained on the basis of said dynamic model also as a function of said updated estimated final value and said current value of the motion variable.

13. The wearable robot according to claim 12, wherein said dynamic model provides a correlation between said current value, said estimated value at the subsequent sequence, their derivatives, and said estimated final value, via a forcing factor function of said phase, said control means being configured to initially compute said forcing factor function in said initialization step on the basis of the motor primitive of the gesture being performed, and to further execute in each sequence the steps of: updating said initially computed forcing factor function on the basis of said error; obtaining the forcing factor corresponding to the current phase of the gesture being performed; and estimating said estimated value of the motion variable at the subsequent phase on the basis of said dynamic model with said forcing factor corresponding to the current phase.

14. A wearable robot to be worn by a user, comprising control means and sensor means adapted to measure a motion variable in a discrete gesture of said user, wherein: a motor primitive library is recorded in said control means for a corresponding plurality of possible discrete gestures, each motor primitive comprising an array of predetermined values for the motion variable in the performance of the relative gesture, sampled as a function of a non-dimensional phase of said gesture; and wherein said control means are configured to iteratively execute, as one of said discrete gesture is performed by the user, sequences of control steps, each sequence comprising the steps of: receiving by said sensor means a measured current value of said variable; retrieving an error by comparison of said current value and an estimated value of the variable obtained at the previous sequence; on the basis of said error and of a normalization of the current value of the motion variable, updating the motor primitive of the gesture being performed, and retrieving from said normalization and from said updated motor primitive a current phase of the gesture being performed; on the basis of said current phase, and of a predetermined dynamic model function of said phase, obtaining said estimated value of the motion variable at the subsequent sequence, to be used to retrieve said error; and on the basis of said current phase, making use of said primitive or of said predetermined dynamic model, retrieving a predictive value of said motion variable in a determined subsequent time or phase period; wherein said control means are configured to execute, in each of said sequences, a verification step that the gesture being performed has ended, said verification step comprising evaluation of a unitary current phase or detection of an external disturbance.

15. The wearable robot according to claim 11, wherein each primitive in said motor primitive library recorded in said control means comprises a matrix with a number of rows equal to a number of sensor of said sensor means provided for the relative gesture, and a number of columns equal to a number of samplings taken for each sensor, or vice versa.

16. The wearable robot according to claim 11, further comprising actuation means adapted to be controlled in real time by said control means on the basis of said estimated value and/or said predictive value of said motion variable to elaborate a control strategy assistive of the gesture being performed and coordinated therewith.

17. The wearable robot according to claim 16, wherein said control means comprise low level feedback correction means driven by a measure signal of a control variable detected at an output of said actuation means.

18. The wearable robot according to claim 11, wherein said sensor means comprise one or more sensor selected from the group consisting of: position sensors, velocity sensors, acceleration sensors, force sensors, pressure sensors.

19. The wearable robot according to claim 11, wherein said control means comprising a microprocessor unit, a data storage medium and battery power means.

* * * * *